United States Patent
Maerten

(10) Patent No.: US 8,833,264 B2
(45) Date of Patent: Sep. 16, 2014

(54) COATED DOUBLE WEAVE FABRIC AND ITS USE FOR THE MANUFACTURE OF INTERCOMMUNICATION BELLOWS

(75) Inventor: Gerard Maerten, Wasquehal (FR)

(73) Assignee: Pennel et Flipo SPRL, Mouscron (BE)

( * ) Notice: Subject to any disclaimer, the term of this patent is extended or adjusted under 35 U.S.C. 154(b) by 118 days.

(21) Appl. No.: 13/132,399

(22) PCT Filed: Dec. 2, 2009

(86) PCT No.: PCT/FR2009/052371
§ 371 (c)(1),
(2), (4) Date: Aug. 23, 2011

(87) PCT Pub. No.: WO2010/063949
PCT Pub. Date: Jun. 10, 2010

(65) Prior Publication Data
US 2011/0290146 A1  Dec. 1, 2011

(30) Foreign Application Priority Data
Dec. 2, 2008 (FR) ...................................... 08 06762

(51) Int. Cl.
*B60D 5/00* (2006.01)
*D03D 11/00* (2006.01)
(Continued)

(52) U.S. Cl.
CPC ........ *D06N 3/0002* (2013.01); *D10B 2331/042* (2013.01); *D03D 11/00* (2013.01); *B61D 17/22* (2013.01); *D10B 2331/04* (2013.01); *Y02T 30/30* (2013.01); *D06N 3/10* (2013.01); *D10B 2401/062* (2013.01); *D03D 1/00* (2013.01); *D10B 2331/14* (2013.01); *D10B 2403/021* (2013.01); *D10B 2505/12* (2013.01); *D10B 2321/042* (2013.01); *D10B 2331/021* (2013.01); *D10B 2505/00* (2013.01); *B60D 5/003* (2013.01); *D06N 7/00* (2013.01); *D10B 2321/10* (2013.01); *D10B 2331/02* (2013.01); *D03D 13/008* (2013.01); *D03D 15/00* (2013.01); *D10B 2401/063* (2013.01); *D10B 2331/301* (2013.01); *D10B 2331/061* (2013.01)

USPC .............................................. 105/18; 14/71.5

(58) Field of Classification Search
CPC ........ B61D 17/22; B61D 17/005; B61D 3/18; B64F 1/305; D03D 11/00; D03D 15/00; D03D 13/00; B60D 5/00; B60D 5/003
USPC .............................................. 105/18; 14/71.5
See application file for complete search history.

(56) References Cited

U.S. PATENT DOCUMENTS 2,841,515 A * 7/1958 Runton ....................... 198/690.2
3,063,966 A   11/1962 Du Pont
4,411,947 A * 10/1983 Heynhold ..................... 442/228

FOREIGN PATENT DOCUMENTS

DE  4007862   9/1990
DE  10246236  4/2004
(Continued)

OTHER PUBLICATIONS

Database WPI week 200650, Thomson Scientific, London GB; AN 2006-484845, XP-002571601 (pp. 2).

(Continued)

*Primary Examiner* — Mark Le
(74) *Attorney, Agent, or Firm* — Graybeal Jackson LLP

(57) ABSTRACT

An embodiment relates to an intercommunication bellows for compartments of a public transport vehicle or for a removable aircraft-access ramp, formed from a coated textile support, comprising a double-weave fabric both faces of which are coated with an elastomeric material, and to a method of connecting two compartments of a public transport vehicle comprising the attachment of an intercommunication bellows between two compartments of the vehicle that are hitched together. An embodiment also relates to a public transport vehicle comprising compartments connected together by an intercommunication bellows. According to an embodiment, the double-weave fabric coated with an elastomeric material has one or more of the following properties: stiffness; delamination resistance; tear resistance.

11 Claims, 6 Drawing Sheets

(51) Int. Cl.
*B61D 17/22* (2006.01)
*D06N 3/10* (2006.01)
*D03D 1/00* (2006.01)
*D06N 3/00* (2006.01)
*D06N 7/00* (2006.01)
*D03D 13/00* (2006.01)
*D03D 15/00* (2006.01)

(56) References Cited

FOREIGN PATENT DOCUMENTS

| | | |
|---|---|---|
| DE | 102004043193 | 3/2006 |
| DE | 102006058470 | 6/2008 |
| DE | 102006061503 | 6/2008 |
| FR | 1213415 | 3/1960 |
| FR | 2792006 | 10/2000 |
| FR | 2831771 | 5/2003 |
| FR | 2879408 | 6/2006 |
| GB | 1005243 | 9/1965 |
| JP | 2006176056 | 7/2006 |

OTHER PUBLICATIONS

International Search Report for International Application No. PCT/FR2009/052371, European Patent Office, Mar. 5, 2010, pp. 3.

\* cited by examiner

| Fibers | ILO | Toxicity | Weaveability | Tenacity cN/tex | A% | Price €/kg |
|---|---|---|---|---|---|---|
| Polyamides 6 and 66 | 20 | HCN, NO$_x$ | OK | 60-80 | 18-20 | 6-7 |
| Polyester | 22 | / | OK | 70-85 | 10-20 | 5 |
| m-aramide (nettings of fibers/filament) | 28 | HCN, NO$_x$ | OK | 40-50 | 15-30 | 26 |
| p-aramide (nettings of fibers/filament) | 29 | HCN, NO$_x$ | OK | 200 | 3-4 | 25-30 |
| Vectran HS | 28-30 | / | OK | 200-230 | 3-4 | 45 |
| Glass E | / | / | OK | 80-135 | 2.5-3.5 | 1.5 |
| Polyimide | 36-38 | HCN, NO$_x$ | Blend + aramide | 38 | 32 | 42 |
| Polyamide-imide | 30-32 | HCN, NO$_x$ | OK | 35-40 | 15-30 | 35 |
| Acrylic homopolymer | 18 | HCN, NO$_x$ | ? | 60-70 | 15-20 | ? |
| Oxidized polyacronitrile (PAN) | 50 | HCN, NO$_x$ | Blend + aramide | 15-20 | 15-21 | 14 |
| Phenolic | 35 | ? | ? | 1.3-1.8 | 10-50 | 20-24 |
| Polybenzimidazole PBI | 40-45 | HCN, NO$_x$ | Blend + aramide | 25-30 | 25-30 | 140 |
| Polyphenylene sulfide PPS | 40 | SO$_3$ | Contact with TRP | 50-55 | 18-20 | 12 |
| Polytetrafluoroethylene PTFE | 35-44 | HF | ? | 19-35 | 13 | 75 |
| Polyether ether ketone (PEEK) | 25-35 | ? | ? | 60 | 20-40 | 190 |
| Polyketone [poly(1-oxotrimethylene)] | ? | / | ok | 110 | 10 | ? |

Figure 3

Figure 4A
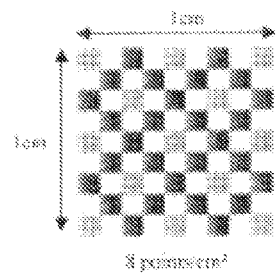
Figure 4B
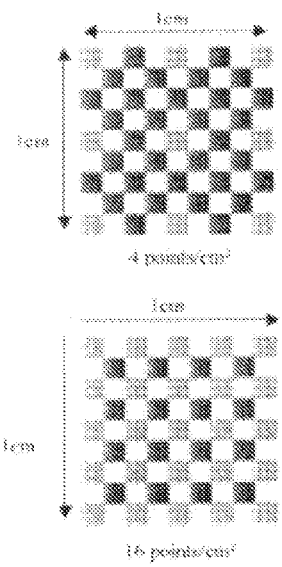
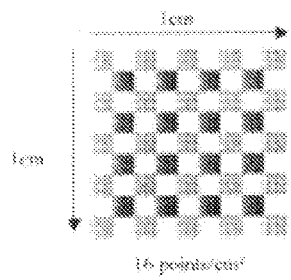
Figure 4C

1　Specimen
2　Shoulder
3　Steel bar

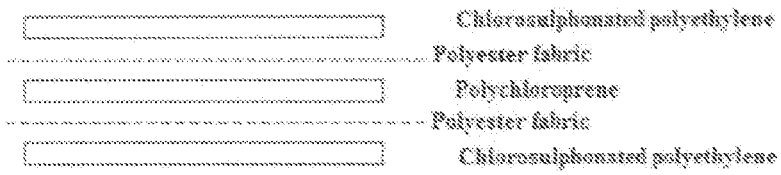
Figure 7A : Coated two-ply fabric (PRIOR ART)
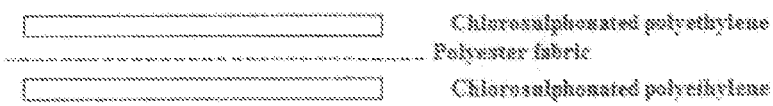
Figure 7B : Coated single-ply fabric (PRIOR ART)
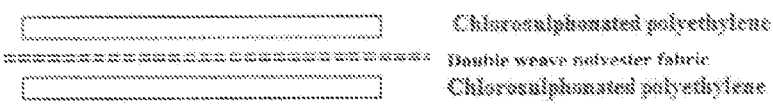
Figure 7C : Coated double weave fabric

8,833,264 B2

COATED DOUBLE WEAVE FABRIC AND ITS USE FOR THE MANUFACTURE OF INTERCOMMUNICATION BELLOWS

PRIORITY CLAIM

The present application is a national phase application filed pursuant to 35 USC §371 of International Patent Application Serial No. PCT/FR2009/052371, filed Dec. 2, 2009; which further claims the benefit of French Patent Application Serial No. 08/06762 filed Dec. 2, 2008; all of the foregoing applications are incorporated herein by reference in their entireties.

TECHNICAL FIELD

An embodiment relates to a textile support coated with an elastomeric material for the confection of intercommunication bellows connecting (linking) two compartments of a public transport vehicle (train, subway, tram, bus, plane . . . ) or intercommunication bellows for removable aircraft access ramps. More particularly, an embodiment relates to the use of a coated textile support comprising a double-weave fabric both faces of which are coated (covered) with an elastomeric material for the manufacture of intercommunication bellows connecting (linking) two compartments of a public transport vehicle. An embodiment also relates to intercommunication bellows for two compartments of a public transport vehicle or for a removable aircraft-access ramp, characterized in that said bellows comprises a textile support coated with an elastomeric material according to an embodiment, as well as to a method for connecting two compartments of a public transport vehicle comprising the attachment of an intercommunication bellows according to an embodiment between two compartments of the vehicle that are hitched together. An embodiment also relates to a public transport vehicle comprising compartments connected (linked) together by an intercommunication bellows according to an embodiment.

In the description below, the references between brackets ([ ]) refer to the list of references given after the examples.

BACKGROUND

Intercommunication bellows connecting (linking) two compartments of a public transport vehicle are typically manufactured with textile supports coated with an elastomeric material in which stiffness for the vertical and horizontal portions of the bellows is sought, the angles (or edges) being achieved with flexible textile supports coated with elastomeric material.

There are currently two types of bellows on the market for the confection of intercommunication bellows connecting (linking) two compartments of a public transport vehicle: the folded bellows (FIG. 1A), and the wavy bellows (FIG. 1B).

An embodiment relates to a coated textile support for the manufacture of bellows where the stiffness of the coated textile support is the most important property to consider.

Particularly, currently, coated textile supports intended for the manufacture of bellows are manufactured from two textile supports connected together with glue or an elastomeric-based coating, the whole set being coated with an elastomeric material. A schematic illustration of this assembly mode is given in FIG. 2.

This construction makes it possible to have a beam effect (i.e., the assembling means is subject to bending similarly to a beam) ensuring stiffness. This assembling mode, however, exhibits the following drawbacks:

Complicated manufacturing method ("Process"), and consequently high manufacturing cost.

Limited adhesion between the two textile supports.

This limitation in adhesion affects the aging of the product, with in particular a possible detachment of the two fabric layers due to repeated bending.

SUMMARY

Thus, there is a real need to develop materials which may be used for the manufacture of intercommunication bellows for compartments of public transport vehicles and overcoming the aforementioned faults and drawbacks of the prior art, in particular, materials allowing to fully satisfy the new European Standards as well as the other standards in this range of application, while maintaining the manufacturing costs at a reasonable level and keeping the advantageous mechanical properties of said bellows.

BRIEF DESCRIPTION OF THE DRAWINGS

FIG. 1 represents two types of intercommunication bellows currently on the market.

FIG. 3 represents a table listing certain properties of the textile fibers available on the market, particularly the mechanical and toxicity properties.

FIGS. 4A-4C represent examples of the junction points of double-weave fabrics. The light grey squares represent the locations where the two fabrics making up the double-weave fabric are connected via their weft/warp yarns.

FIGS. 7A-7C represent diagrams of coated textile supports, objects of example 4. FIG. 7A represents a diagram of a coated two-ply fabric. FIG. 7B represents a diagram of a coated single-ply fabric. FIG. 7C represents a diagram of a coated double-weave fabric.

Figure 1A:
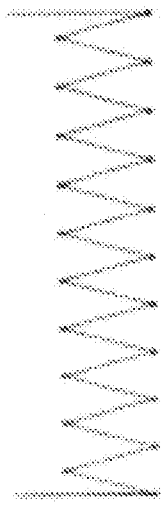
FIG. 1A: "folded" bellows.
Figure 1B:
FIG. 1B "wavy" bellows.

An embodiment aims at providing a textile support coated with an elastomeric material meeting the aforementioned requirements while remaining economically viable. Particularly, an embodiment relates to a double-weave fabric coated with an elastomeric material.

Another embodiment provides an intercommunication bellows for compartments of a public transport vehicle or for a removable aircraft-access ramp, characterized in that said bellows comprises a textile support coated with an elastomeric material comprising a double-weave fabric both faces of which are coated with an elastomeric material. The public transport vehicle is advantageously a land transport vehicle, particularly road or rail transport vehicle, such as a train, tram, bus or subway train. The intercommunication bellows may also find applications in the removable access ramps used for the boarding of passengers on jet liners.

Another embodiment relates to the use of a double-weave fabric coated with an elastomeric material for the manufacture of intercommunication bellows for compartments of a public transport vehicle, or for a removable aircraft access ramp.

In the present document, the expressions "coated textile support" and "textile support coated with an elastomeric material" are used interchangeably.

The term "elastomeric material" refers to a mixture of one or several elastomers and additives, the latter aiming to allow for the transformation/shaping of the elastomer or mixture of several elastomers, and to attain the desired features of the elastomeric material coating the textile support. These additives may be for example silica, plasticizers, flame retardants, protecting agents and/or cross-linking agents.

The term "compartments" refers to compartments of possibly different size and shape, and which, during travelling, are imparted a possibly differential movement relating to one or more of the following variables:

the horizontal and/or vertical inclination with respect to the ground
the travelling direction, and/or
the travelling speed Thus, an embodiment is a textile support coated with an elastomeric material, and characterized in that it comprises a double-weave fabric the two sides of which are coated with an elastomeric material.

The term "double-weave fabric" refers to a textile support composed of two distinct and superposed fabrics which are interwoven together intimately and intermittently at regular spaces by weft yarns of the two fabrics, with the help of the warp yarn. For example, a warp yarn of one of the fabrics may, according to a predetermined sequence, be linked with a weft (or pick) of the other fabric in order to form one single and same fabric. This connection may be achieved according to any type of pattern, typically to form lozenges, squares, rectangles or tubes. The yarns of one of the fabrics participate in the interweaving with the second fabric such that both fabrics composing the double-weave fabric are perfectly secured. There are no spaces between the two fabrics composing the double-weave fabric. Furthermore, the two fabrics cannot move with respect to each other: we are dealing with one single and same double-weave fabric. The number of junction points determines the stiffness of the double-weave fabric.

The double-weave fabric of an embodiment is to be distinguished from the double-layer fabric in which two distinct and superposed fabrics are intermittently connected together by a yarn connecting the two fabrics (i.e., that the two fabrics are not fully attached). By way of example of double-wall fabric (or double-stitch fabric), those described in documents DE 40 07862 (DE' 862) and DE 10 2006 061503 (DE'503) may be mentioned. In DE' 862, the two fabrics composing the two-ply fabric are connected by elastic strings. In DE'503, a space exists between the two fabrics constituting the double-wall fabric. Thus, the two thicknesses of the fabric in DE'862 and DE'503 are in no way attached, and the resulting double-wall fabric does not have the required stiffness properties ("beam effect") of the double-weave fabric of an embodiment.

The term "fabric" is to be understood in the conventional sense, i.e., a material obtained through weaving.

The two aforementioned fabrics making up the double-weave fabric may be identical or different.

The current uses of this type of double-weave fabric are for airbags, firemen's clothes (thermal insulation) and furniture fabric (decorative effect from the double-weave fabric construction).

Generally, according to the related art, the inverse and right sides may be reversed with different colors in order to obtain a decorative effect (furniture fabric).

This double-weave fabric is typically achieved in one single operation on a loom.

With regard to the double-weave fabric, the textile yarns may have the following characteristics:
High mechanical properties:
tenacity of approximately 50 to 110 cN/Tex (ISO.13934-1), elongation at break higher than approximately 10% (ISO 13934-1). The textile yarns of the double-weave fabric may have an elongation at break approximately between 10 and 50%, for example approximately between 10 and 40%, such as approximately between 10% and 30%, approximately between 10 and 25%, and even approximately between 10 and 20% (measured according to the ISO 13934-1 standard).

The textile yarns connecting the two fabrics are non-elastic yarns.

For example, the double-weave fabric may comprise yarns of
polyamide, such as polyamide yarns 6 or 66 polyester
m-aramid, such as those available from KERMEL under the same naming, the yarns available under brand name NOMEX® by DUPONT DE NEMOURS and those available under brand name CONEX® by TEIJIN.
p-aramid, such as those available from DU PONT DE NEMOURS under brand name KEVLAR® or from TEIJIN under brand names TWARON® and TECHNORA®. Such polymers, which thus can be in the form of fibers, yarns or other structures, have made the subject matter of many publications among which U.S. Pat. No. 3,063,966, which is incorporated by reference, may be mentioned.
vectran HS
polyimide
polyamide-imide
acrylic homopolymers
oxidized polyacrylonitrile (PAN)
phenolic
polybenzimidazole (PBI)
polyphenylene sulfide (PPS)
polytetrafluoroethylene (PTFE)
polyether ether ketone (PEEK)
polyketone [poly(1-oxotrimethylene)]
polyphenylsulfone
or a combination thereof.

Thus, in an embodiment, the double-weave fabric comprises polyamide, polyester, aramid or polyphenylsulfone yarns or a combination of these.

The double-weave fabric comprises polyester yarns.

In an embodiment, the double-weave fabric yarns have a mass per unit length of 500 to 2200 decitex, for example of 600 to 2000 decitex, of 700 to 1800 decitex, of 800 to 1600 decitex, of 900 to 1400 decitex, of 1000 to 1200 decitex. The yarns have a mass per unit length of 1100 decitex.

In an embodiment, the double-weave fabric has a thread count of 8/8 to 11/10 yarns per centimeter, i.e., of 8 to 11 yarns/cm in warp and 8 to 10 yarns/cm in weft. In a particular embodiment, the double-weave fabric has a thread count of 8.6/9 yarns per centimeter.

In an embodiment, the number of junction points of the double-weave fabric is of 2 to 20 points/cm$^2$, for example of 2 to 16 points/cm$^2$, for example of 2 to 8 points per cm$^2$. The number of junction points of the double-weave fabric is of approximately 4 points/cm$^2$, for example 8 points/cm$^2$. Examples of junction points are represented in FIG. 4.

The number of junction points will be chosen according to the considered use, and in particular to the desired stiffness for the considered application. The higher the number of junction points, the stiffer the coated double-weave fabric of an embodiment is. The stiffness may be determined for example by the "flat loop" method, or by the "length deflected under its own weight" method, according to the NF EN 1735 standard.

In an embodiment, the double-weave fabric comprises polyester yarns having a mass per unit length of 1100 decitex, a thread count of 8.6/9 yarns per centimeter, and a number of junction points of 8 points/cm².

In an embodiment, the elastomeric material may comprise any elastomer available on the market, particularly those having excellent mechanical and aging properties, adapted to the aforementioned European standards pertaining to the field of intercommunications bellows. To this end, the skilled person can refer to the work "Synthèse, propriétés et technologies des élastomêres" carried out by the Rubber Formation Institute, (IFOCA, Institut de Formation du Caoutchouc in French) and edited by the French group for the study and application of polymers (groupe français d'etudes et d'application des polymers, in French) in October 1984.

For example, the elastomeric material may be:
1) Elastomers for General Use, such as ethylene-propylene-diene terpolymer (EPDM);
2) Elastomers for Specific Uses, such as polychloroprene (CR), a copolymer of hydrogenated acrylic nitrile and butadiene (HNBR), copolymers of ethylene and methyl acrylate or other acrylates (ACM, AEM), polyurethanes (AU, EU);
3) Elastomers for Special Uses, such as polychloroethylene (CM), chlorosulphonated polyethylene (CSM), an epichlorohydrin copolymer (ECO), a heat curable silicon elastomer (EVC), a fluorocarbon elastomer (FPM); or a mixture thereof.

The elastomeric material may comprise chlorosulphonated polyethylene (CSM) as an elastomer.

In an embodiment, the elastomeric material may comprise the chlorosulphonated polyethylene as an elastomer, and the double-weave fabric comprises polyester yarns of mass per unit length of 1100 decitex, has a thread count of 8.6/9 yarns per centimeter (i.e., 8.6 yarns/cm in warp and 9 yarns/cm in weft), and has a number of junction points of 8 points/cm².

The elastomer may be linear or branched, and may be heat curable.

The elastomeric material may contain fillers, such as for example silica, plasticizers, flame retardants (hydrated alumina), protecting agents, and/or cross-linking agents. These additives aim to attain the desired properties of the elastomeric material, and to allow for the transformation/shaping of the elastomer or of the mixture of elastomers that have been used.

According to an embodiment, the total weight of the coated textile support ranges approximately between 600 and 4400 g/m², for example between 1000 and 3000 g/m², for example 1200 g/m². It is understood that the total weight of the coated textile support may be adapted to the order, i.e., according to the application. Typically, the total weight of the coated textile support may be adapted to any required value between 1000 and 3000 g/m².

According to a particular embodiment, the tenacity of the fiber of the double-weave fabric is higher than or equal to 50 cN/Tex (ISO 13934-1) and its elongation at break higher than or equal to 10% (ISO 13934-1). The fiber of the double-weave fabric may have an elongation at break between 10 and 50%, for example between 10 and 40%, for example between 10 and 30%, between 10 and 25%, and even between 10 and 20% (measured according to the ISO 13934-1 standard).

When the coated textile supports according to an embodiment are used for intercommunication bellows for compartments of railroad vehicles, they should notably meet the European Standard project: TS EN 45545-2, which specifically provides for protective measures against fires in railroad vehicles, and in particular fire safety requirements for the design of railroad vehicles.

With regard to this issue, the harmonization of European standards has lead to a homogenization based on the highest requirements, particularly on the criteria pertaining to fire, the obscuration of smoke and the toxicity of emission gases, the mechanical and ageing requirements remaining unchanged.

To this, are added new environmental constraints.

Thus, according to the new standards, the combustion of the material constituting public transport vehicles (e.g. the intercommunication bellows) must be carried out (i) with a minimum flame, (ii) with a reduced obscuration of smoke and (iii) by emitting the minimum of toxic products.

The coated textile supports according to an embodiment may also meet other standards than those aforementioned, particularly those in force outside Europe, depending on the related country and of the use of the intercommunication bellows (type of public transport vehicle, or removable aircraft-access ramp).

Consequently, according to the regulations in force, the composition of the textile supports coated with an elastomeric material constituting the intercommunication bellows may also meet the following three main constraints:

mechanical constraints: the bellows must have a certain tensile strength, tear strength, and repeated bending strength.

ageing constraints: the bellows have a long lifespan (higher than 10 years) and must thus be particularly resistant to climatic (UV, ozone, heat, cold, rain . . . ) and chemical (acids, solvents, greases, oils, . . . ) strains.

fire constraints: in the event of fire, the bellows must resist the fire and emit minimum smoke with minimum toxicity.

Thus, when it is required, or when the regulations in force require it, the double-weave fabric may be made of heat and combustion resistant textile materials.

For example, the elastomeric material coating the double-weave fabric may have an excellent ageing with regard to bad weather and a low combustibility. The elastomeric material may also have a reduced obscuration of smoke. In a particular embodiment, the elastomer or the mixture of elastomers used in the elastomeric material will not contain any halogens or will contain very few. For example, the elastomeric material may comprise heat curable silicone as an elastomer.

When it is desired (for example when the regulations in force require it), the textile yarns may also have combustion strength; for example, the product does not catch fire easily or does not catch fire at all. In an embodiment, the textile yarns of the double-weave fabric may also be such that their combustion gases are not or hardly toxic and without significant smoke.

In an embodiment, textile yarns of the double-weave fabric will also have an economically reasonable price.

FIG. 3 gives the range of values of the aforementioned properties for certain textile fibers available on the market. The reader may refer to it in order to select the type of fiber for a particular use with the required mechanical performances, combustion strength and price. It is worth noting that glass, of low cost is not convenient as its lack of elongation at break (3 to 4%) makes it breakable with the repeated bending.

When it is desired, or when the regulations in force require it, the coated textile support according to an embodiment may exhibit one or several of the following properties (advantageously the four):
(i) fire resistance
(ii) auto-extinction
(iii) does not support combustion
(iv) is not fumigant Thus, according to an embodiment, the elastomeric material covering the coated textile support may comprise an additive selected from the group comprising the additives which improve adhesiveness, durability and/or fire resistance According to an embodiment, the coated textile support comprises a quantity in weight of toxic products less than 8% with respect to the total weight of said coated textile support, said toxic products are selected from the group comprising phthalates, heavy metals, halogens, or a mixture of these. According to a particular embodiment, the coated textile support comprises a quantity in weight of said toxic products less than 7%, 6%, 5%, 4%, 3%, 2%, 1% with respect to the total weight of said coated textile support.

According to an embodiment, the coated textile support is not fumigant. The term "is not fumigant" refers to emitting none or hardly any smoke during its combustion, for example emitting 50% less smoke, or even 60% less smoke, or even 70% less smoke, or even 75% less smoke, or even 80% less smoke, or even 85% less smoke, or even 90% less smoke, or even 95% less smoke, with respect to the composite products of the prior art (for example those aforementioned).

According to a particular embodiment, the coated textile support does not (or hardly) emit(s) toxic gases during its combustion. For example the coated textile support emits between 50 and 95% less toxic gases in volume with respect to the composite products of the prior art, the volume being measured in identical temperature and pressure conditions. By way of example, toxic gases are selected from the group comprising hydrocyanic acid (HCN), NOx, halogens or a mixture of these.

Concerning the manufacture of the coated textile support according an embodiment, the deposit of the elastomeric material on the textile support may be achieved either by coating or by calendering, or by flat die extrusion.

Depending on the desired weight of the coated textile support, several layers of elastomeric material may be deposited.

The mode of deposit by coating makes it possible to obtain a relatively low weight of elastomeric material (between 15% and 50 $g/m^2$ per layer) with great uniformity.

The mode of deposit by calendering makes it possible to obtain more important weights ranging from 100 to 1000 $g/m^2$ per successive layer.

The mode of deposit by flat die extrusion makes it possible to obtain weights ranging from 150 to 1500 $g/m^2$ in one single layer.

Thus, in a particular embodiment, the coated textile support may be manufactured by coating, calendering or by flat die extrusion. More particularly, the coated textile support according to an embodiment may be manufactured by calendering of an elastomeric material and a double-weave fabric that has been adherized beforehand or not on both sides with glue.

According to a particular embodiment, the double-weave fabric may have received, beforehand, a deposit of adhesive paste (notably glue) to allow for a good adhesion of the double-weave fabric and the elastomeric material.

The adhesive paste may contain as constituent, for example glue in the form of a paste. The adhesive paste may be prepared according to good engineering practice. Particularly, it may be solvent-based or water-based (latex), it may be of function of the type of elastomer(s) used, of the fabric to make adhere, of the evaporation system used, as well as other considerations pertaining to the environment.

In a particular embodiment, the adhesive paste is spread on both sides of the double-weave fabric. Within the scope of this embodiment, the adherization may be achieved by coating (doctor blades, cylinders or plastic curves) or by impregnation (dip and possibly hydroextraction). In the case of an adherization by coating, the adhesive paste may be the same or different on each side of the double-weave fabric. In a particular embodiment, specifically when the adherization is achieved by impregnation, the adhesive paste is the same on each side of the double-weave fabric.

The thickness of the adhesive paste may be the same or different on each side of the double-weave fabric. In a particular embodiment, the thickness of the adhesive paste is substantially the same on each side of the double-weave fabric. For example, the adhesive paste is coated or impregnated with a thickness of 15 to 60 $g/m^2$.

The adhesive paste is submitted to a drying operation in order to remove the solvents or the water, and dry the adhesive paste before the deposit of the elastomeric material.

In certain particular embodiments, the drying temperature ranges between 80 and 170° C., according to the solvents used. The drying times are function of the length of the drying tunnel used. Usually, this time ranges between 1 and 2 minutes.

In certain particular embodiments, the deposit of the elastomeric material on the double-weave fabric thus adherized is carried out by calendering.

Once the double-weave fabric coated with elastomeric material, it is subjected to a step of curing/cross-linking.

An embodiment relates to the use of a coated textile support for manufacturing intercommunication bellows for public transport vehicle compartments, or for a removable aircraft-access ramp. More particularly, the coated textile support of an embodiment comes into play in the manufacture of intercommunication bellows connecting (linking) two compartments of a public land transport vehicle, particularly road or railroad. For example, the coated textile support of an embodiment is used for the manufacture of intercommunication bellows connecting (linking) two compartments of a train, subway, tramway, and/or bus.

An embodiment also relates to a double-weave fabric for manufacturing intercommunication bellows connecting (linking) two compartments of a public transport vehicle, or intercommunication bellows for a removable aircraft-access ramp.

Another embodiment relates to intercommunication bellows of compartments for a public transport vehicle or for a removable aircraft-access ramp, said bellows comprising a coated textile support. More particularly, the intercommunication bellows connects (links) two compartments of a public land transport vehicle, particularly road or railroad. For example the intercommunication bellows connect (link) two compartments of a train, subway, tramway and/or bus.

According to an embodiment, it is provided an intercommunication bellows for compartments of a public transport vehicle or for a removable aircraft-access ramp, characterized in that said bellows is formed from a textile support coated with elastomeric material comprising a double-weave fabric both faces of which are coated with an elastomeric material, said coated textile support having a stiffness of 58 to 70 mm in the longitudinal and transversal direction according to the NF EN 1735 standard.

Methods for manufacturing bellows from coated textile supports are well known.

For example, if the coated textile support is cured, the bellows may be prepared by stitching with deposit of glue or a protective product making it possible to protect the stitch yarn and seal the pipe seams (holes formed by the stitching needle). The glue or the protective product may also make it possible to waterproof the bellows.

If the coated textile support is not cured, the bellows can be prepared by depositing the coated textile support in a mold of the desired shape. Then, an open cure and a hot cure are carried out. One may adapt these methods to the manufacture of intercommunication bellows according to an embodiment.

Another embodiment relates to a method of connecting (linking) two compartments of a public transport vehicle comprising a step of attaching the ends of an intercommunication bellows on the facing front sides of the two compartments of said public transport vehicle. An end of the bellows is attached to a front side of a first compartment. The other end of the bellows is attached on the front side of the second compartment facing the first compartment. The ends of the intercommunication bellows may be attached to the two compartments by means of frames having the shape of the front sides of the compartments to be connected or linked together. The intercommunication bellows thus surrounds the passage openings provided between the compartments, thus allowing for the circulation of passengers from one compartment to the next without being exposed to the external environment.

When the connection (linking) between the vehicle compartments comprises a rotating tray for forming an articulation of the two compartments (allowing for sharp turns), the intercommunication bellows of the attaching means may also be provided on the rotating tray.

These are most conventional attaching techniques which the skilled person will know how to select the according to the type of vehicle and the shape of the compartments to connect (link).

Another embodiment relates to a public transport vehicle comprising compartments connected (linked) to each other by intercommunication bellows. Intercommunication bellows for land vehicles (particularly road or railroad), as well as their setting up in these vehicles to ensure the intercommunication (or the intercirculation) between two successive compartments of the vehicle, are well known. It is one of the most classic techniques known to adapt these methods on installing an intercommunication bellows in the targeted public transport vehicles.

In embodiments described in the present document, the public transport vehicle may be, for example, a land transport vehicle (particularly road or railroad). For example, it can be a train, a subway train, a tramway and/or a bus.

In embodiments described in the present document, the intercommunication bellows may be a folded or wavy bellows.

Thus, the textile support coated with an elastomeric material according to an embodiment has the required stiffness to allow for the manufacture of intercommunication bellows for public transport vehicles (particularly trains). This stiffness is ensured by the structure itself of the double-weave fabric.

On the other hand, the mechanical connection of the two textile layers of double-weave fabric is highly increased (see Example 1). This feature makes it possible to considerably reduce the detachment caused by the repeated bending. By way of example, the adhesion measures by peel according to ISO 2411 standard for the classic coated textile supports (i.e., two fabrics glued together, the whole coated with an elastomeric material) are of 10 to 15 daN/5 cm. In contrast, the double-weave fabric coated with an elastomeric material according to an embodiment has a peel adhesion higher than or equal to 20 daN/5 cm (particularly for those carried out from double-weave fabric of 4 points/cm².), or even higher than or equal to 30 daN/5 cm (particularly for those carried out from double-weave fabric of 8 points/c cm².), or even difficult to determine (which tends to indicate that the double-weave fabric coated with elastomeric material according to an embodiment is difficult to delaminate, or even non-delaminatable). The double-weave fabric coated with elastomeric material according to an embodiment thus offers a delamination strength well higher than the classically coated textile supports of the prior art.

Furthermore, the tear strength of the double-weave fabric coated with elastomeric material is also highly increased (see Example 1). Thus, the double-weave fabric coated with elastomeric material according to an embodiment has a tear strength well higher than the classically coated textile supports of the prior art: higher than or equal to 40 daN versus 15 to 20 daN, respectively (ISO 4674-1 standard, method B (tearing of trousers in one single scrape)).

Figure 2:
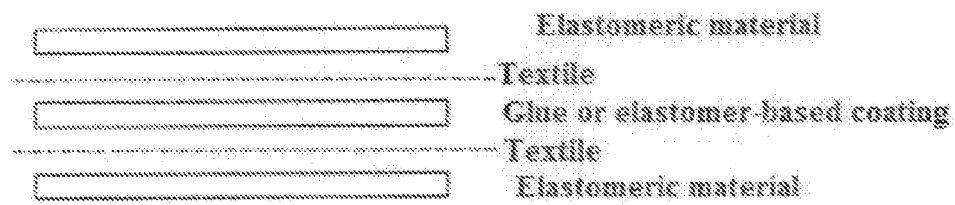
FIG. 2 represents a schematic view of the structure of a coated two-ply textile support of the prior art intended for manufacturing bellows.

Moreover, the double-weave fabric coated with elastomeric material according to an embodiment totally eliminates the recourse to glue or elastomer-based coating of the coated textile supports of the prior art (FIG. 2), which aims to ensure the adhesion between the two textile supports in the materials intended for manufacturing bellows. Here, no glue or elastomer-based coating is necessary. The adhesion of the two textile fabrics is ensured by the structure itself of the double-weave fabric. Consequently there are three noteworthy advantages:

there is no possible detachment as the double-weave fabric is attached and behaves as one and the same fabric. The drawback of the detachment caused by the repeated bending is thus eliminated.

the weight of the final coated textile support is thus lessened (the glue/linking coating is removed) without however affecting the mechanical and stiffness properties of the end product on the contrary, the quantity of glue/elastomer-based coating used in the conventional two-ply materials (FIG. 2) may be removed in favor of an equivalent quantity of elastomeric material coating both sides of the double-weave fabric. Thus, with equal weight, the coated textile support according to an embodiment is endowed with better ageing properties with respect to the materials currently available on the market (more coating of elastomeric material while maintaining the same weight).

Furthermore, the manufacturing process of the coated textile support according to an embodiment is simplified as there is no more deposit of glue between the two fabrics. This deposits requires 6 passages through the machine (an impregnation and two coatings per fabric), whereas with a double-weave fabric, it is reduced to 1 passage (one impregnation).

An embodiment is thus remarkable in so far as it constitutes a viable alternative solution to the coated textile supports currently on the market, intended for the manufacture of intercommunication bellows. An embodiment particularly allows for the manufacture of intercommunication bellows connecting (linking) the compartments of public transport vehicles, which have the required mechanical properties for this type of application (i.e., stiffness ("beam effect"), and tear and delamination strength), while keeping the manufacturing costs at a reasonable level.

The contents of the protocols relative to international (ISO), French and European (NF, EN) standards, mentioned in the present document is incorporated by reference in the present document in its entirety. These protocols are on sale to the public on the AFNOR website (http://www.boutique.afnor.org), which is incorporated by reference.

Features and advantages of one or more embodiments will become apparent upon reading the examples below, illustrated by the accompanying drawings.

DETAILED DESCRIPTION

Examples

Example 1

Preparation of a Double-Weave Fabric Coated with an Elastomeric Material by Calendering a) Double Weave Fabric The double-weave fabric is composed of 2 fabrics made up of high tenacity polyester yarns having a mass per unit length of 1100 decitex and a thread count of 8.6/9 yarns per centimeter (i.e., 8.6 yarns per centimeter in the warp direction, and 9 yarns per centimeter in the weft direction).

The link between the two layers of fabric is ensured by junction points spaced apart by 5 mm in warp and in weft; i.e., 8 junction points per cm$^2$ (see FIGS. 4A-4C).

b) Elastomer

The elastomeric material is a chlorosulphonated polyethylene-based (CSM) based elastomer. It may be obtained from Dupont Performance Elastomère (USA) "Hypalon®", Tosoh (Japan) "Toso CSM®" or Jining (China).

c) Coating

The elastomeric material is arranged on the double-weave fabric by calendering according to the following method:

Before the deposit of the elastomeric material, 60 to 70 g/m$^2$ of adhesive paste is deposited on both sides of the double-weave fabric. This paste is deposited using the impregnation technique. This paste is a composition having a dry matter of 30%.

A drying operation is then carried out to dry this adhesive paste and remove the solvents (toluene and methyl ethyl ketone (MEC)), at a temperature higher than 160° C.

The deposit of elastomeric material on the adherized double-weave fabric is carried out by calendering on each of the two sides of the textile (one layer per side).

d) Curing

After deposit of the elastomeric material, a thermal treatment is carried out for the cross-linking. It is carried out continuously on a machine and under pressure. The temperature ranges between 180 and 185° C., for example 183° C.

e) Properties

The total weight of the double-weave fabric coated with the thus obtained elastomeric material is of 1200 g/m$^2$.

Three important characteristics of this coated fabric are the following:

Stiffness: determination of the stiffness according to the NF EN 1735 standard: 58 to 70 mm in the longitudinal and transversal direction in the warp and weft direction (method called "flat loop")

Tear strength: trouser tear according to ISO 4674-1, standard method B: 40 to 50 daN.

Delamination strength between the 2 layers of fabric: peel adhesion according to ISO 2411 standard: 20 to 30 daN/5 cm.

Example 2

Preparation of a Double-Weave Fabric Coated with an Elastomeric Material by Flat Die Extrusion The operating process is the same as that of the calendering method of example 1 (i.e., with prior adhesion). The calender is replaced by a flat die extruder. The deposit may go from 100 to 1500 g/m$^2$ but in one single operation (monolayer).

Example 3

Methods for determining the stiffness of a double-weave fabric coated with an Elastomeric Material According to an Embodiment The stiffness (or on the contrary the suppleness) of a coated double-weave fabric according to an embodiment may be determined according to the European and French NF EN 1735 standard.

Two methods are available according to the aforesaid standard.

Flat Loop Method

The principle is as follows: the loop is shaped on a rectangular strip of the coated textile support, placed on a horizontal plane, by superposing the two ends which are then connected together under a steel bar. The height of the loop is measured. The suppleness is characterized by the height of the loop: the smaller the height of the loop, the greater the suppleness. Inversely, the greater the height of the loop, the greater the stiffness.

Figure 5A:
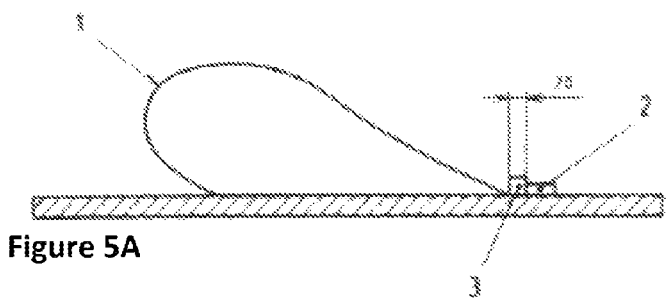
FIGS. 5A-5B represent diagrams of a device for determining the stiffness of the coated textile supports according to a flat loop method.
Figure 5B:
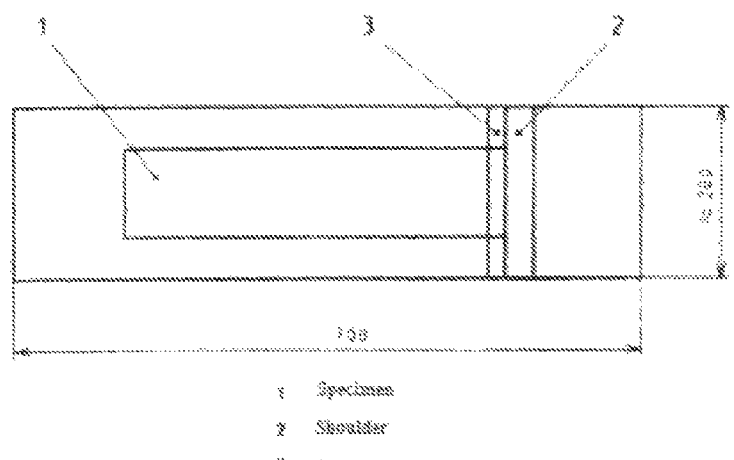

The test apparatus is typically composed of the following parts (see FIGS. 5A-5B):

a flat rectangular plank provided with, near one of its ends, with a shoulder whereof the side is perpendicular to the axis of the plank (the dimensions indicated on FIGS. 5A-5B are given by way of example; they may be increased to allow for the attaching of several specimens on the same plank).

a stainless steel bar of around 200 mm in length and of square section of around 20 mm on the side.

a millimeter graduated ruler.

As a general rule, the temperature of the specimens (tested samples) highly influences the suppleness value. Thus, it may be necessary to condition the latter during at least 24 hours in one of the normal atmospheres of EN ISO 2231 and to carry out the tests in the same atmosphere. In order to prevent any deformation of the specimens, the conditioning must be achieved on a horizontal surface, the side which must form the outside of the loop being turned upwards.

The specimen has the shape of a rectangle of 600 mm+/−5 mm in length and of 100 mm+/− in width.

Three cut out specimens in the longitudinal direction and three cut out specimens in the transversal direction of the coated textile support are used to test.

The sampling is typically taken from the useful width of the roller according to the ISO 2286-1 standard.

The surface of the plank is powdered uniformly with zinc stearate or talc powder. By holding the ends of the specimen between one's fingers, the latter is placed on the plank such as one of its sides rest on the plank and that one end is pressed against the shoulder (the choice of the side to use depends on the destination of the product. The test may also be carried out again after having tipped the specimen on the opposite side).

The other end is connected to the first such as to form a loop, by also pressing it against the shoulder.

The steel bar is placed in position on the two superposed ends. The specimen is maintained in this position during 5 minutes+/−0.5 minute.

On each specimen, is measured, using the graduated ruler, the maximum heights with respect to the plank from the two edges of the loop (three specimens cut out in the longitudinal direction and three in the transversal direction). Thus, there are two values per specimen, and twelve values in all.

The suppleness is given by the arithmetic mean of the six values obtained in the longitudinal direction and the six values obtained in the transversal direction.

Method of the length deflected under its own weight ("longueur fléchie sous son poids" in French)

The principle is as follows: a rectangular strip of coated textile support is placed on a horizontal platform. When the strip is moved on the platform, the end leaves the platform, then bends under its own weight. When the strip is sufficiently advanced, the end touches an inclined plane. The bending length is the length of the specimen between the edge of the platform and the point 0 of the ruler. This length is given by direct reading of the ruler if there was no sliding.

Figure 6:
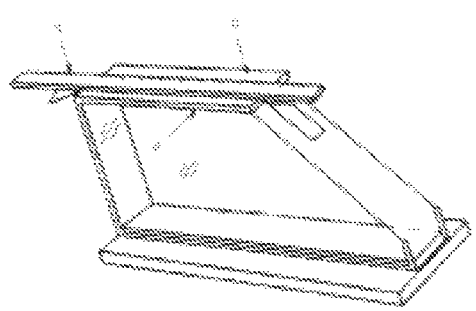
FIG. 6 represents the diagram of a device for determining the stiffness of the coated textile supports according to a "length deflected under its own weight" method.

The test apparatus is typically composed of the following parts (see FIG. 6):

a horizontal platform P treated on its upper surface to allow for the easy sliding of the specimen a stiff graduated ruler S (a metal piece of around 25 mm wide is suitable). The lower side of the ruler S is covered with a material that has a high friction coefficient (rubber paper for example) such as when the ruler S is made to advance, it drags forward the specimen placed between the ruler and the platform P an inclined plane forming an angle of 41° 30'+/−30' under the horizontal (the measure range depends on the size of the device).

As for the flat loop method, the temperature of the specimens highly influences the suppleness value. Thus, it may be necessary to condition these during at least 24 hours in one of the normal atmosphere of the EN 180 2231 and to carry out the tests in the same atmosphere. In order to prevent any deformation of the specimens, the conditioning must be achieved on a horizontal surface, the side which should be upward on the flexometer being turned upwards.

The specimen has the shape of a rectangle of 25 mm+/−1 mm wide and a length such that it allows for the determination of the length of bending. A length of 200 mm is usually sufficient.

10 specimens are usually used cutout in the longitudinal direction and 10 specimens cut out in the transversal direction.

The sampling is typically taken from the useful width of the roller according to the ISO 2286-1 standard.

The flexometer is placed on a level table. The specimen is placed between the platform P and the ruler S such that the line D, the 0 of the graduated ruler, and the end of the specimen coincide. The ruler is pushed so that the end of the specimen advances over the inclined plane, bends under the force of its own weight and comes to touch the inclined plane. The test lasts around 10 seconds.

The bending length is the length of the specimen between the edge of the platform and the point 0 of the ruler. This length is given by directly reading the ruler if no sliding has occurred.

The test is repeated on other specimens by changing the side in contact with the platform.

The bending lengths are measured separately in the longitudinal direction then in the transversal direction on each side.

For each measurement, there are five specimens. The result is the arithmetic mean of the five measurements carried out in centimeters.

Example 4

Examples Comparing the Stiffness of Coated Textile Supports

The stiffness of the three types of coated textile supports is measured according to the flat loop method described in Example 3 above.

The coated textile supports are illustrated in FIGS. 7A-7C.

The results are listed in the table below:

| Type of coated textile | Stiffness (mm) in the longitudinal direction |
|---|---|
| Two-ply polyester fabric coated with chlorosulphonated polyethylene-based elastomeric material (CSM or Hypalon ®) | 60 |
| single-ply polyester fabric coated with chlorosulphonated polyethylene-based elastomeric material (CSM or Hypalon ®) | 50 |
| Double weave polyester fabric coated with chlorosulphonated polyethylene-based elastomeric material (CSM or Hypalon ®) | 60 |

The coated double-weave fabric according to an embodiment is much stiffer than its single-ply homologue and as efficient in stiffness as the coated two-ply.

Thus, the coated double-weave fabric according to an embodiment may be more advantageous than the coated textile supports that are currently used for the manufacture of intercommunication bellows for public transport vehicles, as it has the advantages of two-ply textile supports in terms of stiffness, without the drawbacks (bad tear and delamination strengths). Moreover, the double-weave fabric coated according to an embodiment is less expensive.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An intercommunication bellows for compartments of a public transport vehicle or for a removable aircraft-access ramp, wherein said bellows is formed from a double-weave fabric, consisting of two distinct and superposed fabrics interwoven together intimately and intermittently at regular spaces by weft yarns of the two fabrics, with help of warp yarn, both faces of the double-weave fabric are coated with an elastomeric material, said coated double-weave fabric having a stiffness of 58 to 70 mm in the longitudinal and transversal directions and having a delamination strength between the two distinct and superposed fabrics of the double-weave fabric that is at least 20 daN/5 cm.

2. The intercommunication bellows according to claim 1, wherein the elastomeric material comprises an elastomer selected from ethylene-propylene-diene terpolymer, polychloroprene, a copolymer of hydrogenated acrylic nitrile and butadiene, a copolymer of ethylene acrylates, a polyurethane, polychloroethylene, chlorosulphonated polyethylene, an epichlorohydrin copolymer, a heat curable silicone elastomer, a fluorocarbonated elastomer, or a mixture of two or more thereof.

3. The intercommunication bellows according to claim 1, wherein the double weave fabric comprises polyamide, polyester, m-aramid, p-aramid, vectran HS, polyimide, polyamide-imide, acrylic homopolymers, oxidized polyacrylonitrile, phenolic, polybenzimidazole, polyphenylene sulfide, polytetrafluoroethylene, polyether ether ketone, poly(1-oxotrimethylene), polyphenylsulfone yarns, or a combination of two or more thereof.

4. The intercommunication bellows according to claim 1, wherein yarns that form the double weave fabric have a mass per unit length of 500 to 2200 decitex.

5. The intercommunication bellows according to claim 1, wherein the double weave fabric has a thread count of 8 to 11 yarns/cm in warp and of 8 to 10 yarns/cm in weft.

6. The intercommunication bellows according to claim 1, wherein a number of junction points of the double weave fabric is 2 to 20 points/cm$^2$.

7. The intercommunication bellows according to claim 1, wherein the elastomeric material comprises chlorosulphonated polyethylene, and the double weave fabric comprises polyester yarns with a mass per unit length of 1100 decitex, has a thread count of 8.6 yarns/cm in warp and of 9 yarns/cm in weft, and has a number of junction points that is 8 points/cm$^2$.

8. A method for connecting two compartments of a public transport vehicle, the method comprising a step of attaching an end of the intercommunication bellows according to claim 1 on a front side of a first compartment, and attaching another end of the bellows on a front side of a second compartment facing said first compartment.

9. A public transport vehicle comprising compartments connected to each other by an intercommunication bellows according to claim 1.

10. The intercommunication bellows of claim 1, wherein the delamination strength between the two layers of the double-weave fabric is between 20 to 30 daN/5 cm.

11. The intercommunication bellows of claim 1, wherein the delamination strength between the two layers of the double-weave fabric is at least 30 daN/5 cm.

* * * * *